Jan. 6, 1959    H. A. WINTERMUTE    2,867,285
GAS CLEANING APPARATUS
Filed March 13, 1956    2 Sheets-Sheet 1
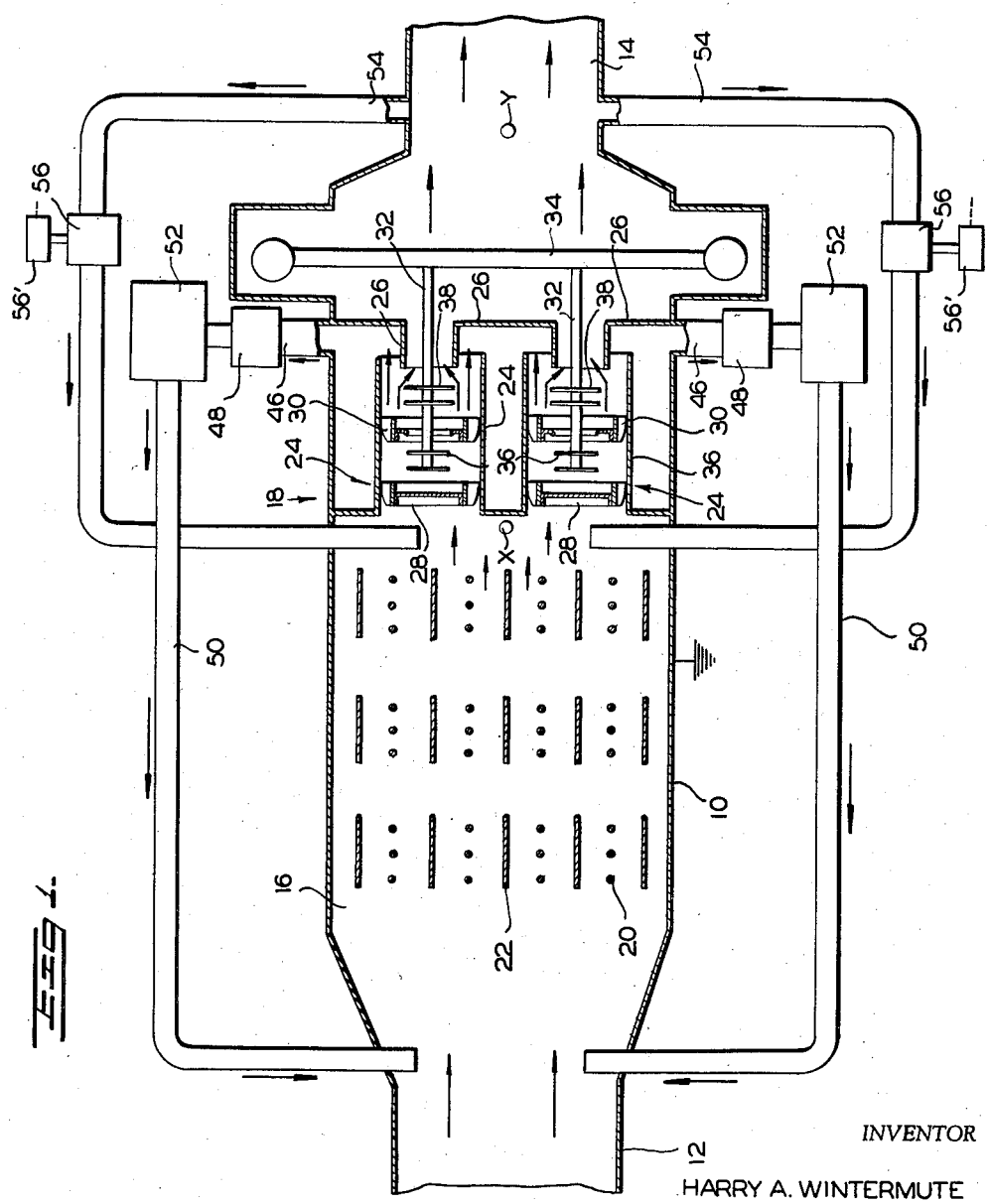
INVENTOR
HARRY A. WINTERMUTE
BY *Harold F. Stowell*
ATTORNEY

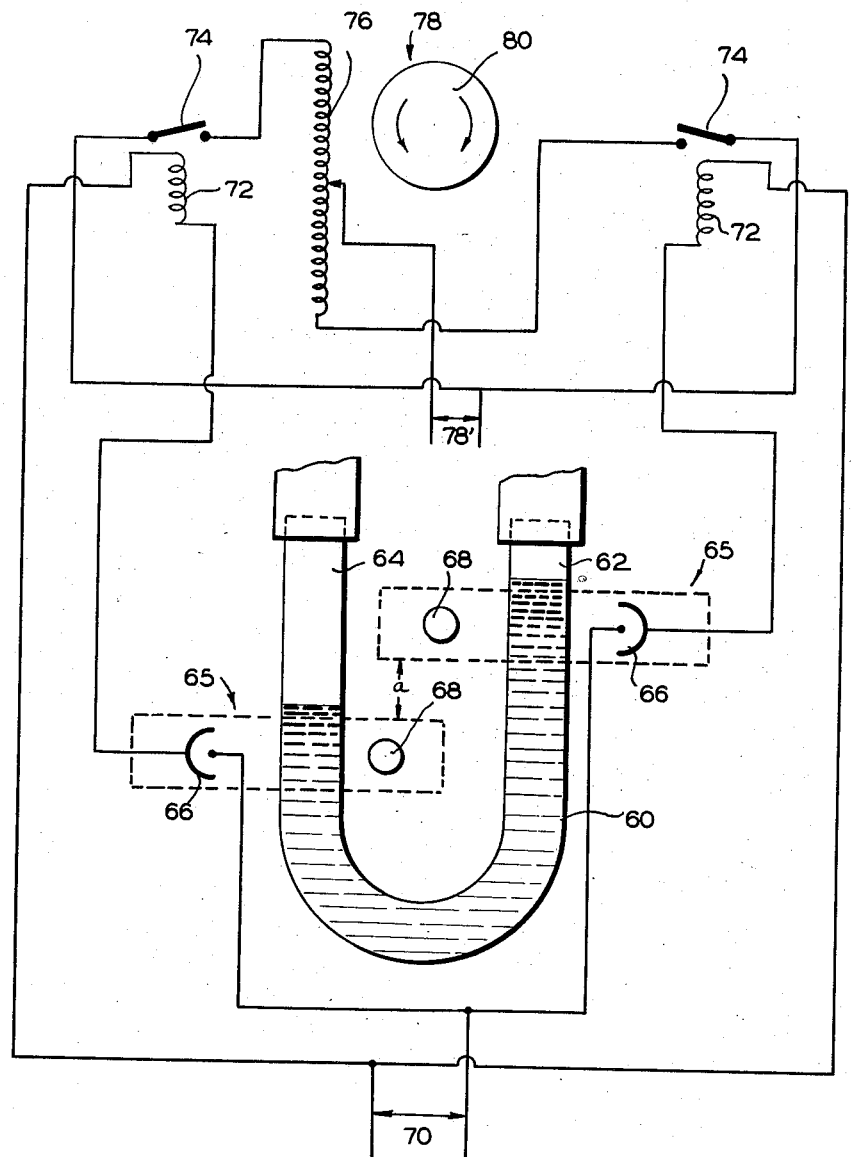

United States Patent Office 2,867,285
Patented Jan. 6, 1959

2,867,285

GAS CLEANING APPARATUS

Harry A. Wintermute, Plainfield, N. J., assignor to Research Corporation, New York, N. Y., a corporation of New York Application March 13, 1956, Serial No. 571,300

3 Claims. (Cl. 183—7)

The present invention relates to new and useful improvements in electrified centrifugal dust collectors and more particularly and specifically to new and useful methods and apparatus for controlling the volume of gas flow in such collectors.

It has been discovered that satisfactory and efficient operation of electrified centrifugal dust collectors is obtained only when the gas flow through the collector is maintained above a predetermined volume. When the gas flow falls below this given volume arcing occurs in the normal corona discharge zones opposite the discharge electrode elements of the collector thereby destroying the precipitation effect and at the same time causing a build-up of dust particles opposite the discharge electrode elements which adversely affects recovery of the collector by centrifugal action. It has also been discovered that conventional rapping will not prevent the build-up of deposits within such collectors when they are operating at gas flows below a predetermined critical volume.

It is, of course, acknowledged that the critical volume for any given collector is dependent not only on the dimensions of the collector but also upon the type of dust medium to be precipitated by the collector. For example, fly ash low in coarse material requires a high gas flow volume through such electrified collectors, while fly ash high in coarse material can be effectively handled at lower gas flow volumes.

Electrified dust collectors of conventional constructions have utilized certain additives introduced into the gas stream in advance of the collector in an effort to avoid arcing and build-up in those areas opposite the discharge electrodes. Other conventional apparatus of this type has included the utilization of secondary separator or collecting stages to compensate for the efficiency losses inherent in the primary stage resulting from arcing and built-up deposits.

The present invention serves to provide improved methods and apparatus by which the gas flow passing through the collector is automatically maintained above a given, preselected critical volume whereupon deposits are avoided and arcing in the precipitation field is eliminated.

It is a general object of the present invention to provide new and improved methods and apparatus for controlling the volume of gas flow in an electrified centrifugal dust collector which substantially eliminate all of the problems and disadvantages inherent in prior, conventional apparatus of the same general type.

Another object of this invention is the provision of apparatus for controlling the volume of gas flow in a dust collector wherein automatic presettable controls are utilized for the purpose of constantly maintaining the gas flow above a preselected volume.

Still another object of this invention is the provision of apparatus for association with a centrifugal dust collector which operates automatically to recirculate a preselected volume of gas through the collector to maintain the gas flow therethrough above a given critical volume.

Still a further object of this invention is the provision of apparatus for recirculating gas through an electrified dust collector wherein the volume of gas recirculated is automatically controlled from the pressure drop through the collector whereupon the rate of flow through the collector is continuously maintained above a given critical volume.

Another and still further object of the present invention resides in a new and improved method for automatically maintaining the volume of gas flow through an electrified dust collector above a preselected critical volume.

Still further objects and advantages of the present invention will become more readily evident to those skilled in the art when the general statement and description, following hereinafter, are read in the light of the accompanying drawings wherein:

Fig. 1 is a diagrammatic sectional elevation of the collector constituting the present invention.

Fig. 2 is a schematic diagram of the automatic control system constituting a part of the present invention.

With reference to the drawings, and in particular to Fig. 1 thereof, the gas cleaning device of the present invention is shown as comprising an elongated tubular housing 10 provided at one end thereof with a gas inlet 12 and at the remote end thereof with a gas outlet 14. The housing is generally divided into two treating areas, namely, the electrostatic precipitation area 16 adjacent the gas inlet and the centrifugal-electrostatic treating area 18 intermediate the treating areas 16 and the outlet 14.

In the gas treating area 16 there is provided conventional electrostatic precipitation means which includes a plurality of spaced rows of discharge electrodes 20 together with a plurality of collecting plate electrodes 22 arranged intermediate the rows of discharge electrodes 20. The electrodes 20 and 22 are maintained at a high potential difference as is well known in the art.

The electrical-centrifugal treating means 18 comprises tubular housings 24 having centrifugal and electrical precipitation zones therein. Each of the tubes 24 is provided with annular skimmer members 26 which open into discharge ducts 46 extending outwardly of the housing 10. The ducts 46 connect through fans or blowers 48 to conduits 50, the remote open ends of which are positioned in the gas inlet 12.

Positioned at the inlet end of each separator tube 24 is a gas swirling vane set 28 while a second vane set 30, in the form of an annulus, is positioned intermediate the length of each tube.

A high tension electrode rod 32 for each tube 24 is secured to the bus bar 34 to extend coaxially into its respective tube. The upstream end of each rod 32 supports a pair of disc-shaped discharge electrodes 36 between vane sets 28 and 30. A second set of disc-shaped discharge electrodes 38 is carried by each rod 32 on the downstream side of vane set 30. The disc-shaped electrodes 36 and 38 prevent undue expansion of the swirling gases and are maintained at a high potential to emit corona discharge as disclosed in my Patent 2,667,942 issued February 2, 1954.

An auxiliary cyclone type dust collector 52 is located in each of the recirculating lines 50 to perform second stage separation of gases recirculated through the lines 50 in manners to be hereinafter described.

To complete the construction, a second set of conduits 54 opens in radial opposition outwardly of the housing from the mouth of the discharge outlet 14 and connects through a fan 56 having induction type speed regulators 56' associated therewith to the inlet side of the centrifugal separating chamber of the collector.

In operation of the dust collector above defined flue gas or the like having fly ash suspended therein enters the housing 10 through the inlet 12 thereof and passes through the electrostatic precipitation area of the housing wherein a portion of the suspended fly ash is precipitated out of the gas on the collecting plates from which it is removed in conventional manner. The gas after passing through the conventional electrostatic precipitation zone enters the annular passage in the centrifugal-electrostatic separating area and is induced to a centrifugal flow within the area by the swirling vanes 28 and 30 therein. The flue gas under centrifugal action will tend to separate with the heavier fly ash particles therein forming an outer boundary layer within the annular chamber, and the lighter, cleaner gas making up the inner boundary layer within the passage. Such gas, divided into boundary layers as described, upon leaving the second set of swirling vanes will be divided by the skimmer members 26 into a dust-ladened outer boundary layer which is returned through the recirculating lines 50 to the inlet side of the electrostatic precipitation field, while the cleaner gas forming the inner layer will pass to the discharge outlet 14 of the housing. The recirculated dirty gases are subjected to secondary separation within the auxiliary cyclone type collectors 52 prior to reentering the inlet side of the collector housing.

In the present construction the swirling gases in the centrifugal collection area are additionally subjected to an electrostatic separation by the corona discharge discs 36 and 38 on the rods 32. This additional electrostatic treatment of the gases as they pass through the centrifugal treating area will cause further concentration of suspended fly ash and the like in the outermost boundary layer of gas.

Associated with the dust collector hereinbefore described is a control system for maintaining a constant volume of gas flow entering the collectors 18 at a selectable rate above a known critical volume necessary to maintain the walls of collector tubes 24 free of precipitated material. This system consists principally of an automatic control for the operation of the fans 56 which control the amount of gas recirculated to the inlet side of the electrified centrifugal treating area of the collector. The automatic control is such that it operates in direct proportion to the pressure drop through the centrifugal treating area of the collector.

Referring in particular to Fig. 2 of the drawings, the control system consists of a U-tube manometer which includes a vertically arranged U-tube 60 having an opaque liquid partially filling the same wherein each of the legs 62 and 64 of the tube are connected through suitable tubing to the interior of the collector housing 10. The leg 64 has communication with that portion of the housing interior immediately in advance of the centrifugal treating area therein or at X and the leg 62 has communication with that area of the housing interior intermediate the discharge side of the centrifugal treating area and the discharge outlet of the housing as at Y. By this arrangement, the liquid levels within the two legs of the U-tube are determinative of the pressure differential between the two defined treating areas within the collector housing.

Each of the legs 62 and 64 of the U-tube is provided with a photoelectric cell unit 65 which comprises a photoelectric cell 66 and a light source 68. Each photoelectric cell 66 and its corresponding light source are positioned on opposite sides of one of the legs 62 and 64 of the manometer so that the position of the liquid levels in the legs thereof may be sensed.

The photoelectric cell units 65 are each vertically adjustable on its respective leg of the manometer for initial adjustment of the unit for the desired pressure drop across the electrified centrifugal collectors 18. For example, increasing the distance (a) between the units 65 provides for a greater pressure drop across the collector and conversely by decreasing the distance (a) the pressure drop and volume are decreased as to be more fully described hereinafter.

Each of the two photoelectric cells 66 is connected in parallel with a source of current 70, such as 110 volt alternating current to a coil 72 of switch 74 normally biased in the open position.

Switches 74 are connected through line current 78' to shading coils 76 in the field of the commercial split phase type motor 78 whereby the direction of rotation of the rotor 80 of the motor 78 is caused to rotate in one direction or the other depending upon which of the pair of switches 74 is closed through the excitation of its corresponding photoelectric cell 66.

The armature 80 of motor 78 is drivably connected to the conventional induction regulators 56' of fans or blowers 56.

In operation of the control system above described the placement of the two photoelectric cells 66 is adjusted to liquid levels in each tube preselectable in accordance with the desired pressure drop to be maintained through the electrified centrifugal treating area of the collector and which predetermines the volume of gas flow therethrough. Thus when there is a change in the preselected pressure differential, there will be a change in the liquid levels in said legs causing one or the other of the electric cells to be energized, dependent upon the rise and fall of the opaque liquid within the U-tube legs, resulting in one or the other of the two switches 74 being activated through the appropriate coils 72. This causes operation of said reversing motor in one direction or the other to bring about an increase or decrease in the operating speed of the fans 56. Such change in the operating speed of the fans 56 will increase or decrease the volume of gas recirculated to the inlet side of the electrified centrifugal treating area of the collector to thereby adjust the volume of gas flow through the collector and return the pressure differential to the preselected balance. When the pressure differential, preselected by the placement of the photoelectric cells, is returned to balance the photoelectric cells will again be deenergized and the speed of the operation of the recirculating fans 56 will be stabilized.

As hereinbefore described, it is necessary, for the efficient operation of the electrified centrifugal collectors 18, to maintain the inner surfaces of separator tubes 24 free of collected material opposite the corona discharge zones. Otherwise arcing destroys the precipitation effects and collection due to corona discharge within the collectors 18 is lost. Further build-ups of material opposite the corona discharge elements 36 and 38 adversely affect recovery from the centrifugal action of the collectors.

The gas velocity through the collectors 18 to maintain the walls of tubes 24 clean varies for different types of suspended material and the spacing of the photoelectric units 66 must in general be determined experimentally. For example, with electrified centrifugal collectors wherein the diameter of the separator tubes was 9 inches and 50% of the area of tubes was taken up by the inner diameter of the vanes and the corona discharge elements the following critical volumes were observed below which inefficient operation resulted:

(1) With 0.11 grain of carbon black per cubic foot suspended in air at from about 80° to about 90° F. the critical volume was about 200 C. F. M. per tube with a recovery of about 99%.

(2) With 0.1 to about 0.2 grain of fly ash, mostly grit (+325 mesh) per cubic foot of air at about 270° F the critical volume for two tubes was about 525 C. F. M.

(3) With about 2 grains of fly ash, 50% fines of −325 mesh, per cubic foot of air at 270° F. the critical volume for two tubes was about 575 C. F. M.

In general, the upper limits of gas volume are not critical. However, when the gas volume is increased substantially the efficiency of the units falls off due to interference of the discharge electrodes with the swirling gas stream. The principal objection, however, to operating the electrical centrifugal separators at very high volumes is the substantial increase in power requirements.

From the foregoing description, it will be seen that a novel and highly useful gas cleaning mechanism is provided whereby optimum collecting efficiency is maintained. It will be further evident that various modification may be made in the volume control system therefor. For example, the fan regulators 56' may be controlled by the arcing rate of the electrified centrifugal separators 18 so that the rotation of fans 56 is speeded up with arcing and reduced when arcing in the separator is decreased. A system suitable for such regulation of the fans 56 is disclosed in U. S. Patent Applicantion Serial No. 451,770, filed August 24, 1954, now Patent No. 2,783,388.

It is also evident that a control system has been provided, in combination with the improved dust collector disclosed herein, which automatically maintains a constant volume of gas flow through the centrifugal-electrical separating area above a preselectable critical volume.

Hence, with the knowledge that a given size collector operating upon a flue gas having a known fly ash density requires the maintenance of a gas flow above a predetermined volume, the present apparatus enables the maintenance of said gas flow above said critical volume at all times, thereby avoiding arcing and built-up deposits normally incident to such form of separation resulting in the operation of such a collector at maximum efficiency.

Thus, with the foregoing accomplishment of objects and advantages of this invention, and with the detailed disclosure of the new and improved methods and apparatus constituting the present invention in mind, what is desired to be claimed is:

1. In an electrified centrifugal gas cleaning device including a tubular housing, a gas swirling and separating chamber in the housing, a gas inlet and a gas outlet for said gas swirling and separating chamber and control means sensitive to a pressure differential between the inlet and the outlet of the chamber for maintaining a constant volume of gas flow through said chamber, said control means including a gas recirculating connection communicating with the gas outlet and gas inlet for said chamber, powered fan means in said recirculating connection, an electric control element having operable connection with said fan power means, a presettable meter measuring differential in pressure between the gas inlet and gas outlet, and said control element having responsive connection to said meter.

2. In combination with an electrified centrifugal gas cleaning device including a gas swirling and separating chamber having a gas inlet and a gas outlet, control apparatus for maintaining a constant volume of gas flow through said chamber consisting of a gas conduit having communication between said gas outlet and said gas inlet, powered fan means in said conduit, a U-tube, one leg of said tube having communication with the gas inlet, the second leg of said tube having communication with the gas outlet, a liquid balanced in the legs of said tube by the differential in pressures between said inlet and said outlet, and means responsive to variations in the liquid levels in said U-tube legs for controlling the operation of the powered fan in said gas conduit.

3. In combination with a gas cleaning device, as defined in claim 2 wherein said means responsive to variations in the liquid levels consists of photoelectric cells associated one with each leg of said U-tube, said cells being responsive to variations in liquid levels in the legs of said U-tube, control means for said powered fan, and said cells having operable connection with said control means.

References Cited in the file of this patent

UNITED STATES PATENTS 2,223,287    Kingsland    Nov. 26, 1940

FOREIGN PATENTS 709,677    France    May 20, 1931